United States Patent

Houghton et al.

[15] 3,646,846
[45] Mar. 7, 1972

[54] FIBROUS GRAPHITE PACKING

[72] Inventors: George E. Houghton, Palmyra; Sudhakar G. Dixit, Rochester, both of N.Y.

[22] Filed: Jan. 19, 1970

[21] Appl. No.: 3,743

[52] U.S. Cl. ........................................ 87/1, 57/153, 277/230
[51] Int. Cl. .................... F16j 15/22, B65d 53/00, D04c 1/02
[58] Field of Search ..................... 87/1, 8, 23; 277/230, 227, 277/229, 237; 161/39, 88, 89, 175, 176; 57/153, 164

[56] References Cited

UNITED STATES PATENTS

| | | |
|---|---|---|
| 3,124,032 | 3/1964 | Webster et al. .............................. 87/1 |
| 3,306,155 | 2/1967 | Zumeta et al. ............................... 87/1 |
| 3,403,595 | 10/1968 | Watson ......................................... 87/1 |
| 3,534,652 | 10/1970 | Zumeta et al. ............................... 87/1 |

Primary Examiner—John Petrakes
Attorney—John P. Murphy

[57] ABSTRACT

A packing material comprising graphite strands of fibrous material, said strands and interstices therebetween, being thoroughly impregnated with impregnating material comprising a fluorocarbon resin and a solid lubricant, such as graphite.

4 Claims, 5 Drawing Figures

PATENTED MAR 7 1972

3,646,846

INVENTOR
GEORGE E. HOUGHTON
SUDHAKAR G. DIXIT
BY
John P. Murphy

FIBROUS GRAPHITE PACKING

BACKGROUND OF THE INVENTION

1. Field of the Invention

This invention relates to new sealing materials. More particularly, it relates to the provision of new structures which are capable of withstanding high temperatures, and highly corrosive environments, as are found in the chemical industry, and in similar operations. More specifically, it relates to braided packings, molded packings, gaskets and similar sealing devices, made of flexible graphite filaments impregnated with a fluorocarbon resin and solid lubricant.

As used herein, the term "finely divided, particulate solid lubricant" refers to materials such as graphite, molybdenum disulfide, mica, talc, diselenides of niobium, tungsten, and tantalum, covalent nitrides such as boron nitride, as described in Volume 9, page 345, of "The Encyclopedia of Chemical Technology," all having a crystalline layer lattice structure, as described in "The Encyclopedia of Chemical Technology," Volume 8, page 531.

2. Description of the Prior Art

The industrial process and in many machines, sealing materials are needed which are corrosion-resistant, and heat-resistant, and which, at the same time, will provide for a long period of service. This is particularly true in the case of stuffing boxes in machinery as, for example, in an arrangement for packing a rotary shaft or reciprocating rod at a point where the shaft or rod extends through a packed opening into a part of a machine containing some fluid to be held therein against escape.

Conventional packings, as used commercially, generally consist of certain fibers such as flax, jute, cotton, asbestos and others; spun and twisted into yarns that are braided or twisted into packing or woven into fabrics which are used to form packings of various sizes for piston rods, plungers, shafts, valve stems or other moving, mechanical parts. Such packings may be impregnated with liquid lubricants, greases and lubricating compound to reduce friction, and to aid in the sealing function. Said packings, furthermore, are frequently armored or combined with various metals such as lead, copper, aluminum, etc., to further reduce friction and give a partial or full metallic wearing face on the moving parts. The method of combining the metal with other ingredients usually involves a process of wrapping, twisting, or interbraiding the metal in the form of foil or wire, to produce the partial or full metallic wearing face. Prior art packings are shown in the following representative references: U.S. Pat. Nos. to Watson 3,403,595, to Wrotnowski et al. 2,930,106, to Webster et al. 3,124,032, to Crossley 2,107,661, to Brackett 2,134,324, to Zumeta et al. 3,306,155, to Armstrong 2,251,211.

SUMMARY

As contrasted with the prior art, described above, the present invention provides a packing material which has a high temperature and chemical resistance, and is resilient. In addition, the likelihood of overheating, or burning, which results from the gland adjustments made in the environment wherein the packing material operates, is greatly reduced by the addition of graphite and/or other solid lubricants to the impregnating material comprising finely divided fluorocarbon resin.

It is a primary object of this invention to produce a material suitable for packing purposes which is more easily installed in its operating position, and wherein the likelihood of burning or destruction of the packing, at the time of startup, is greatly reduced.

It is an object of this invention to produce a material suitable for packing purposes which has high temperature and chemical resistance, and is resilient.

Another object is to produce a material suitable for packings that has improved dimensional stability through a greater range of temperatures.

Another object is to produce a fluorocarbon resin and graphite or solid lubricant impregnated fibrous graphite packing material which is compressible, but does not permanently deform, laterally, under high stuffing box pressures.

Another object is to provide a method for incorporating fluorocarbon resins and graphite or other solid lubricant permanently into a fibrous graphite packing material to obtain increased dimensional stability and still provide sealing action, and to reduce greatly the destruction of the packing material resulting from adjustment of packing glands with the resulting overheating.

Another object is to produce a packing material impregnated with fluorocarbon resin which has three-dimensional strength, and has the required porosity to accept the fluorocarbon resin particles and graphite or other solid lubricant impregnating material in the packing, and to retain said particles and impregnating material.

Various other objects and advantages of the present invention will become apparent as this description proceeds.

These and other objects may be accomplished and the disadvantages of the prior art packing materials may be overcome by the use of a packing material comprising an elongate braid of strands of graphite filament yarn, said strands and interstices therebetween being thoroughly impregnated with impregnating material comprising finely divided fluorocarbon resins and solid lubricants having crystalline layer lattice structures, such as graphite.

DESCRIPTION OF THE PREFERRED EMBODIMENTS

Before describing apparatus suitable for carrying out the process, the latter is outlined briefly as follows:

The graphitized fibers are drawn off of a suitable support, such as spools, and have a fluorocarbon resin and graphite mixture applied thereto, preferably while separated from each other, hereinafter described in more detail. Said fibers, or strands, are dried and then preferably twisted to form a single multiple-ply yarn, after which the same is wound on bobbins and used in a braiding machine to form a braided product. The braiding operation builds up a packing of the desired cross section, usually square, but it may be in different forms. The fluorocarbon resin and graphite mixture may be preferably applied at two stages in the process, and is then dried. At this point, the packing may be run through calendering rollers to square it more accurately, which operation compresses it more or less as may be desired. The fluorocarbon resin and graphite mixture, in which the graphitized fiber yarns are dipped, is in the form of a fluid dispersion which is capable of penetrating into the fibrous material and further impregnating the same. Such dispersions preferably contain one or more of the many suitable dispersion stabilizing agents, such as "Triton X-100," manufactured by the Rohm and Hass Co. Such dispersions, or suspensoids, are described in U.S. Pat. No. 2,478,229. Suitable polymer and copolymer colloidal dispersions, or emulsions, which may be used in the practice of the present invention, are also described in U.S. Pat. Nos. 2,534,058, 2,559,752, 2,613,193 and 2,718,452.

In addition to the suspensoids, or colloidal dispersions of virgin fluorocarbon resin, as described above, presintered PTFE and PTFE-like materials may be employed in the practice of the present invention. Such materials, and the method of their application to packing, are described in U.S. Pat. No. 3,124,032.

A preferred form of solid lubricant, as used herein, is a product of the Acheson Colloids Corp. known as "AQUADAG" which is a colloidal graphite lubricant, consisting of microscopic particles of graphite dispersed, or diffused in a liquid. The dispersion is made up of water and very fine particles of graphite, having a solids content of 22 percent and a consistency of from paste to a viscous liquid with an approximate weight in pounds per gallon of 9.35.

Figure 1:
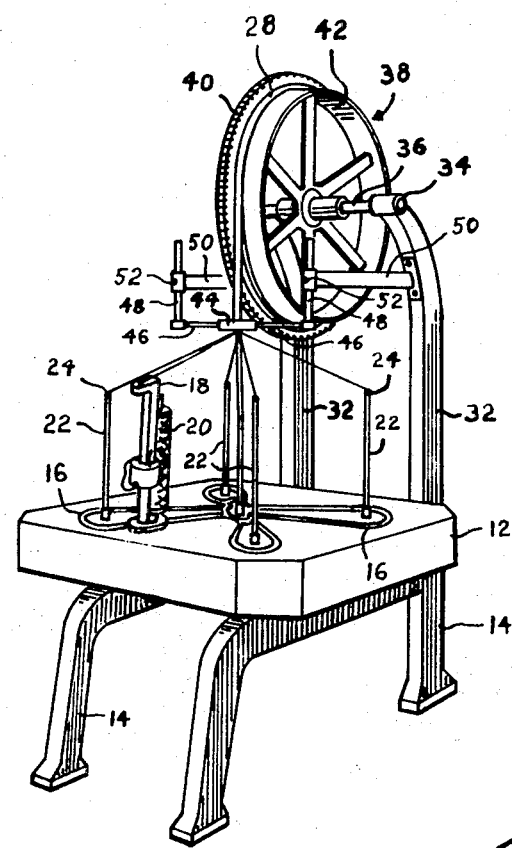
FIG. 1 is a largely diagrammatic perspective view of mechanical means for making the subject braided packing.

Referring to the drawings in detail, FIG. 1 shows a known form of braiding machine, but only sufficient detail to afford an understanding of this invention. The machine comprises a flat table 12, mounted on supports 14, and formed with continuous slots 16 which define a more or less undulating path, back and forth, and in various directions across the table. Slidably mounted upon the table and at various spaced points along said slots 16 are plural yarn carriers 18 (only one being shown), each carrying a package 20 of graphite yarn; and these carriers are positively moved upon the table, in and under the guidance of said slots by suitable gear means (not shown) underneath the top of the table. Yarn drawn from these carriers becomes, what may be termed, the "braided yarn" of the finished braid.

Prior to braiding, the graphite yarn is impregnated by immersion in a dispersion of PTFE and finely divided, particulate solid lubricant. In this specific embodiment, the solid lubricant is preferably graphite, and particularly graphite sold by Acheson Colloids Corp. under the trade name "AQUADAG." The yarn is then dried and twisted, after which it is wound in packages 20 suitable for mounting on carriers 18.

The dispersion is prepared as follows: a graphite dispersion is blended with water until smooth. Then, PTFE suspensoid is added and the entire mixture is again blended until smooth. Preferably, PTFE, or other fluorocarbon resins, comprises between 60 percent and 80 percent and graphite, or other solid lubricants, comprises between 40 percent and 20 percent of the solids content of the dispersion.

An exemplary mixture is as follows:

| | |
|---|---|
| Graphite Dispersion (22% graphite) | 10 lbs. |
| Water | 10 lbs. |
| PTFE Suspensoid (60% solids) | 11 lbs. |

The procedure would provide a final mixture containing 2.2 lbs. of graphite particles and 6.6 lbs. of PTFE particles. Thus, the solids composition of the final mixture would be 25 percent graphite and 75 percent PTFE.

Another procedure for making the sealing materials of the present invention involves the impregnation of the graphite filaments or fibers with a finely divided, particulate solid lubricant only, such as graphite, to produce a product with no PTFE, where the impregnant is 100 percent solid lubricant. In a similar manner graphite filaments or fibers may be impregnated with the other finely divided, particulate solid lubricants such as molybdenum disulfide, mica, talc, diselenides of niobium, tungsten, and tantalum, ditellurides of niobium, tungsten, and tantalum, covalent nitrides such as boron nitride, as described in Volume 9, page 345, of "The Encyclopedia of Chemical Technology."

As used herein, "PTFE" means polytetrafluoroethylene.

Figure 2:
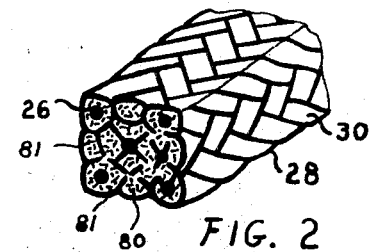
FIG. 2 is a fragmentary cross-sectionalized perspective view of braided packing according to this invention.

Means may also be provided for feeding some strands of yarn straight into the braid being formed. Such strands will extend in substantially straight lines longitudinally of the braid and may be termed "longitudinal strands." These longitudinal strands serve to limit the extensibility of the finished braid as well as help to shape the braid into a square cross section. These strands are impregnated in the same manner as the braid yarns. The means for feeding these longitudinal strands into the braid are illustrated as similar corner masts 22 fixed upon the table near each of the latter's corners. Strands of graphite yarn, drawn from yarn rolls (not shown) beneath the table, are drawn upwardly through eyelets 24 at the upper ends of the masts; there strands become longitudinal side strands 26 in the braid 28 as shown in FIG. 2, the braided graphite yarn being indicated at 30 in said FIG. 2.

Extending rigidly from the back of the table are two uprights 32 each having at its upper end a bearing 34 which accommodates an axle or shaft 36 of a wheel 38 having an integral ring gear 40 by means of which, in association with other gears (not shown), the wheel 38 is positively rotated. The rim of the wheel 38 is in the form of a narrow drum 42 about which one or several turns of the braid may extend and be tightened by means (not shown) to prevent slippage of the braid on the drum, and hence, cause upward pull of the braid formed from the strands of yarn drawn upwardly from the carriers 18 and the masts 22.

The strands of yarn, in passing upwardly from the carriers 18 and masts 22, are guided together through a braiding die 44 in a crossmember 46 having upwardly extending slide arms 48, adjustably slidable in suitable vertical bores in the outer ends of brackets 50 which are suitable fixed to the uprights 32. Setscrews 52, at the ends of the brackets 50 serve to lock the crossmember 46 at any level to which it may be adjusted.

The braiding operation proceeds in a well-understood, conventional manner. After the braid producing operations thus far described, the braid may be immersed in a PTFE-graphite dispersion, which is the same as that used to impregnate the yarn prior to braiding, to achieve better penetration of the impregnant in the yarn and in the braid, and to give it a coating 79 which more securely holds the external PTFE and graphite particles to the surface of the braid. The impregnated braid is dried until the water constituent is dispelled from the braid, leaving the braid thoroughly impregnated with PTFE and graphite. The impregnated, dried braid also undergoes a further operation, not illustrated, in which it is calendered to give it a relatively smooth surface and to establish its desired cross-sectional shape.

Figure 3:
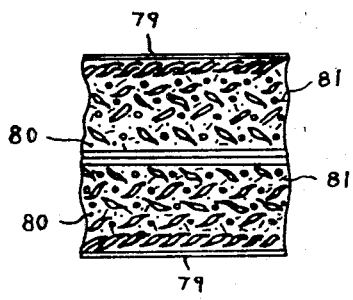
FIG. 3 is an enlarged, longitudinal sectional view of the packing of FIG. 2.
Figure 5:
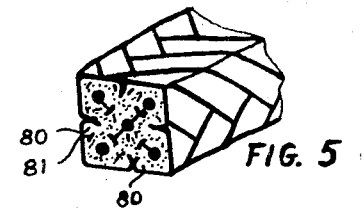
FIG. 5 is a view, of the same character as FIG. 2, but illustrating yet another form of packing according to this invention.

Thus, full advantage is taken of the filling, sealing, heat-resisting, inertness, and low-friction characteristics of PTFE and graphite. Although the impregnation of the braid with particles of PTFE is so thorough as to render it impracticable to distinctly illustrate those particles, nevertheless, they have at least been indicated in FIGS. 2, 3 and 5, by numerous dots at 80 in those figures. Also, the graphite particles are similarly illustrated, as at 81.

Figure 4:
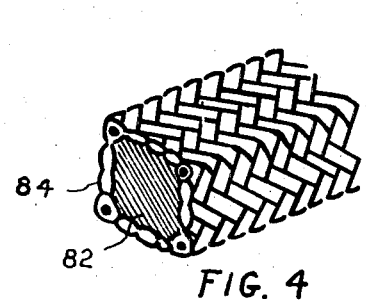
FIG. 4 is a view, of the same character as FIG. 2, but illustrating another form of packing according to this invention.

This invention may be utilized in packing which is not necessarily braided throughout its diameter. Thus, as illustrated in FIG. 4, a finished braided packing, within this invention may have a core 82 of some plastic material, selected in accordance with the particular use in which the packing is to be employed. The braided portion 84, of course, would be thoroughly impregnated with finely divided PTFE and graphite, similarly to the impregnation indicated in FIG. 3. Similarly, the fibrous materials of the packing need not necessarily be braided. Rather, woven fabrics or twisted fibrous forms will be suitable for use in some packing forms.

The sealing materials provided hereby are insoluble in all known volatile solvents; they are stable at high temperatures; they are abrasion resistant; they are relatively chemically inert; and they have a low rate of thermal expansion allowing the sealing of either hot or cold materials alternately. They present surfaces which are not sticky but are advantageously waxy in character. In a stuffing box, the movability of the fibrous and nonfibrous components, separately and relatively to each other, makes for excellent sealing under low, medium, or high pressure applications, and their chemical resistance makes them especially useful in those applications which involve highly corrosive environments.

The addition of the finely divided particulate solid lubricant greatly reduces the overheating or burning and possible packing destruction which has been common at machine startup and thus adds to the life of the packing. The thermal conductivity factor of the packing of the present invention is relatively high, and its ability to transfer heat from the interface between the packing and the moving machine parts is believed to be, in theory, a principal reason for its success in providing improved startup or break-in characteristics and a long service life in subsequent operation.

Tests of the braided packing, described in the specific embodiment above, have sown the new packing of the present invention to be more easily and safely installed than previously available fibrous graphite packings and packings impregnated with fluorocarbon resins. The tests have also shown the packing of the present invention to be cooler running, to require fewer gland adjustments and to reduce shaft wear, all as compared to previously available packings. Thus, the packing of this invention will function to reduce premature packing failures and to promote generally increased overall service life.

As used herein, the term "fluorocarbon resin" refers to polymerizable or polymerized fluoroplastics. Specific polymeric resins contemplated for use in the practice of the invention include polytetrafluorethylene, polychlorotrifluoroethylene, copolymers of tetrafluoroethylene and polyvinylidene fluoride, hexafluoropropylene, and fluorinated ethylene-propylene copolymers. In view of its superior heat and chemical resistance, the homopolymer, polytetrafluorethylene is preferred. Of course, it is possible to employ a mixture of two or more different fluorocarbon resins or fluoroplastics in the practice of the invention. Suitable fluoroplastics are described in U.S. Pat. Nos. 2,774,702, 2,549,935 and 2,686,738. Other suitable fluoroplastics useful in the practice of the invention will readily occur to those skilled in the art.

In practicing this invention in the manufacture of packing material, a graphitized fiber as described in U.S. Pat. No. 3,107,152 may be employed.

Since certain changes may be made in carrying out the process of the present invention in producing the desired results, without departing from the scope of the invention, it is intended that all matter contained in the above description is to be interpreted as illustrative and not in a limiting sense.

What is claimed is:

1. Packing material comprising graphite strands of fibrous materials, said strands and interstices therebetween being thoroughly impregnated with impregnating material comprising a fluorocarbon resin and a finely divided, particulate, solid lubricant having a crystalline layer lattice structure.

2. Packing material comprising graphite strands of fibrous materials, said strands and interstices therebetween being thoroughly impregnated with impregnating material comprising a fluorocarbon resin and graphite.

3. The article of claim 1, in which the fluorocarbon resin is polytetrafluoroethylene.

4. Packing material, according to claim 1, wherein the impregnating material comprises from 60 to 80 percent PTFE and from 40 to 20 percent graphite.

* * * * *

UNITED STATES PATENT OFFICE
CERTIFICATE OF CORRECTION

Patent No. 3,646,846     Dated March 7, 1972

Inventor(s) George E. Houghton and Sudhakar G. Dixit

It is certified that error appears in the above-identified patent and that said Letters Patent are hereby corrected as shown below:

(73) Assignee: GARLOCK INC.
                       Palmyra, New York

Signed and sealed this 19th day of September 1972.

(SEAL)
Attest:

EDWARD M. FLETCHER, JR.　　　　　　　　ROBERT GOTTSCHALK
Attesting Officer　　　　　　　　　　　　Commissioner of Patents